US012689704B2

(12) United States Patent
Leng et al.

(10) Patent No.: US 12,689,704 B2
(45) Date of Patent: Jul. 21, 2026

(54) VIDEO PROCESSING METHOD AND APPARATUS, AND DEVICE, MEDIUM AND PROGRAM PRODUCT

(71) Applicant: Beijing Zitiao Network Technology Co., Ltd., Beijing (CN)

(72) Inventors: Xiaoxu Leng, Beijing (CN); Yongjie Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 266 days.

(21) Appl. No.: 18/569,313

(22) PCT Filed: Aug. 22, 2022

(86) PCT No.: PCT/CN2022/113881
§ 371 (c)(1),
(2) Date: Dec. 12, 2023

(87) PCT Pub. No.: WO2023/025085
PCT Pub. Date: Mar. 2, 2023

(65) Prior Publication Data
US 2024/0267484 A1 Aug. 8, 2024

(30) Foreign Application Priority Data
Aug. 24, 2021 (CN) .......................... 202110977267.6

(51) Int. Cl.
*H04N 5/272* (2006.01)
*G06T 7/00* (2017.01)
(Continued)

(52) U.S. Cl.
CPC ........... *H04N 5/272* (2013.01); *G06T 7/0002* (2013.01); *G06T 7/20* (2013.01); *H04N 5/2628* (2013.01);
(Continued)

(58) Field of Classification Search
CPC ...... H04N 5/272; H04N 5/2628; H04N 5/262; G06T 7/0002; G06T 7/20;
(Continued)

(56) References Cited

U.S. PATENT DOCUMENTS 9,560,271 B2 * 1/2017 Na ....................... H04N 23/635
10,482,359 B2 * 11/2019 Kauffmann ............... G06T 5/77
(Continued)

FOREIGN PATENT DOCUMENTS

CN 106650744 A 5/2017
CN 108470326 A 8/2018
(Continued)

OTHER PUBLICATIONS

ISA China National Intellectual Property Administration, International Search Report and Written Opinion Issued in Application No. PCT/CN2022/113881, Nov. 25, 2022, WIPO, 12 pages.
(Continued)

*Primary Examiner* — Shahbaz Nazrul
(74) *Attorney, Agent, or Firm* — Alleman Hall LLP

(57) ABSTRACT

Provided in the present disclosure are a video processing method and apparatus, and a device, a medium, a program product and a computer program. The video processing method provided in the present disclosure comprises: in response to a trigger instruction, acquiring a target image, wherein the target image is a video frame prior to a reference image, and the reference image is a video frame that is currently acquired by an image sensor; then performing, by using a background region in the target image, completion and filling on a target region, in which a target object is located, in the reference image; and finally, displaying the processed image as the current video frame.

17 Claims, 4 Drawing Sheets

(51) Int. Cl.
    *G06T 7/20*         (2017.01)
    *H04N 5/262*      (2006.01)

(52) U.S. Cl.
    CPC .............. *G06T 2207/10016* (2013.01); *G06T 2207/20016* (2013.01)

(58) Field of Classification Search
    CPC . G06T 2207/10016; G06T 2207/20016; G06T 2207/20221; G06T 5/50; G06T 5/77
    See application file for complete search history.

(56)           References Cited

U.S. PATENT DOCUMENTS

| | | | | |
|---|---|---|---|---|
| 11,328,396 B2 * | 5/2022 | Jung | .......................... | G06T 5/60 |
| 2012/0320237 A1 * | 12/2012 | Liu | ......................... | H04N 5/272 |
| | | | | 348/E5.051 |
| 2014/0341474 A1 * | 11/2014 | Dollar | ..................... | G06T 7/246 |
| | | | | 382/197 |

| | | | | |
|---|---|---|---|---|
| 2021/0390669 A1 * | 12/2021 | Jayasuriya | ............. | H04N 19/20 |
| 2023/0217097 A1 * | 7/2023 | Wu | ......................... | H04N 23/80 |
| | | | | 348/208.1 |
| 2023/0421716 A1 * | 12/2023 | Zhou | ......................... | G06T 5/70 |

FOREIGN PATENT DOCUMENTS

| | | |
|---|---|---|
| CN | 111886624 A | 11/2020 |
| CN | 112637517 A | 4/2021 |
| CN | 112884664 A | 6/2021 |
| CN | 113014846 A | 6/2021 |
| CN | 113139913 A | 7/2021 |
| CN | 113747048 A | 12/2021 |
| JP | 2011119926 A | 6/2011 |
| WO | 2021110226 A1 | 6/2021 |

OTHER PUBLICATIONS

China National Intellectual Property Administration, Office Action and Search Report Issued in Application No. 202110977267.6, mailed Apr. 1, 2025, 15 pages.

\* cited by examiner

| | |
|---|---|
| Acquire a target image in response to a triggering instruction | 101 |
| Generate a processed image by performing completion filling on a target region in a reference image with a background region in the target image | 102 |
| Display the processed image as the current video frame | 103 |

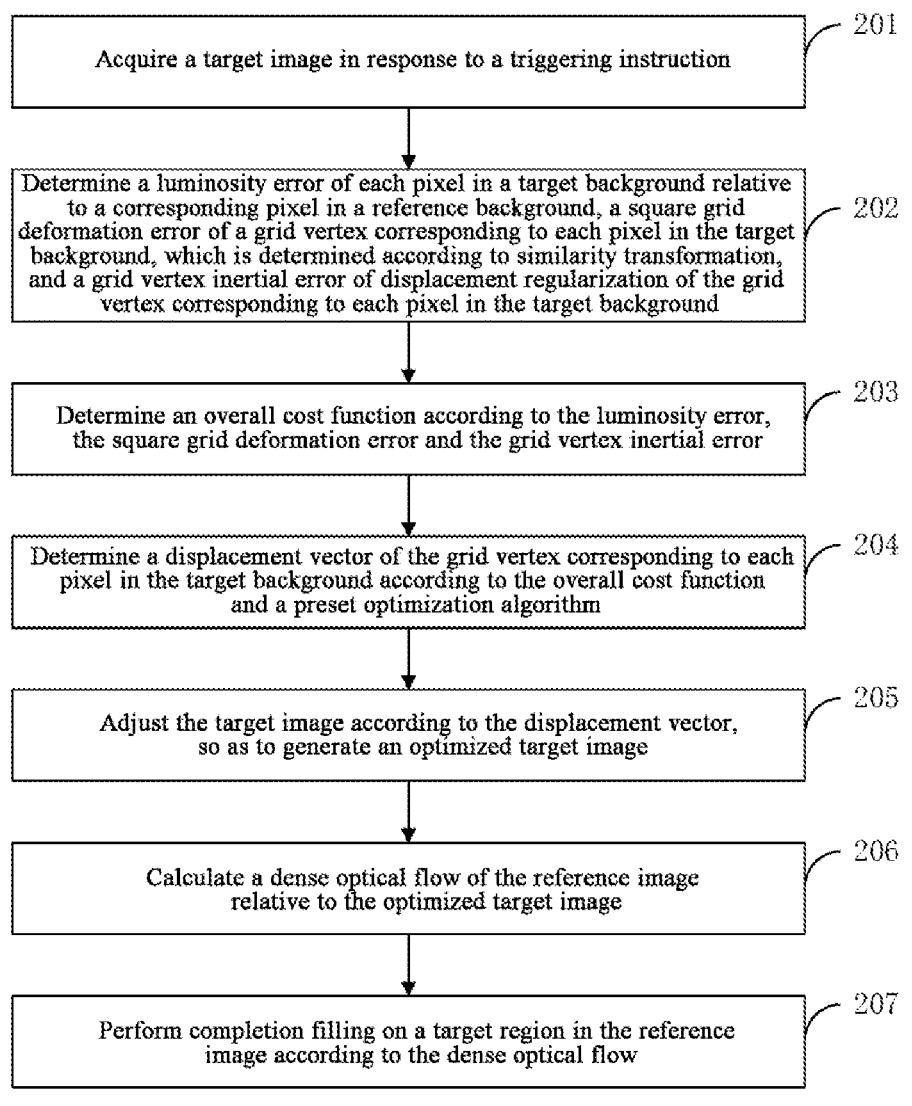

Acquire a target image in response to a triggering instruction — 201

Determine a luminosity error of each pixel in a target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background — 202

Determine an overall cost function according to the luminosity error, the square grid deformation error and the grid vertex inertial error — 203

Determine a displacement vector of the grid vertex corresponding to each pixel in the target background according to the overall cost function and a preset optimization algorithm — 204

Adjust the target image according to the displacement vector, so as to generate an optimized target image — 205

Calculate a dense optical flow of the reference image relative to the optimized target image — 206

Perform completion filling on a target region in the reference image according to the dense optical flow — 207

FIG. 3

VIDEO PROCESSING METHOD AND APPARATUS, AND DEVICE, MEDIUM AND PROGRAM PRODUCT

CROSS-REFERENCE TO RELATED APPLICATION(S)

This application is a U.S. National Stage Application of PCT Application Serial No. PCT/CN2022/113881, filed Aug. 22, 2022, which claims priority to Chinese Application No. 202110977267.6, filed in the China Patent Office on Aug. 24, 2021, and entitled "Video Processing Method and Apparatus, and Device, Medium and Program Product", the disclosures of which are incorporated herein by reference in their entireties.

FIELD

The present disclosure relates to the technical field of video processing, and in particular, to a video processing method and apparatus, and a device, a medium, a program product and a computer program.

BACKGROUND

With the development of the communication technology and terminal devices, various terminal devices, such as mobile phones, tablet computers and the like, have become an indispensable part in the works and lives of people, and with the increasing popularity of the terminal devices, a video application becomes a main channel for communication and entertainment.

In the video application, a foreground completion technology may be widely applied to the field of digital entertainment special effects, the existing foreground completion technology usually performs completion by using a deep learning method, and specifically, a video frame is generally completed jointly by an optical flow network and a generative adversarial network (GAN).

However, with regard to the above completion mode via deep learning, the calculation amount in a completion process is relatively large, therefore if real-time completion needs to be performed, it is difficult to ensure the real-time performance.

SUMMARY

The present disclosure provides a video processing method and apparatus, and a device, a medium, a program product and a computer program, so as to solve the problem of it being difficult to ensure the real-time performance of foreground completion in the current video interaction application.

In a first aspect, an embodiment of the present disclosure provides a video processing method, including:

acquiring a target image in response to a triggering instruction, wherein the target image is a previous video frame of a reference image, and the reference image is a video frame that is currently acquired by an image sensor;

generating a processed image by performing completion filling on a target region in the reference image with a background region in the target image, wherein the target region is a region covered by a target object in the reference image; and displaying the processed image as the current video frame, wherein the processed image is an image after the target object is at least partially removed from the reference image.

In a second aspect, an embodiment of the present disclosure provides a video processing apparatus, including:

an image acquiring module, configured to acquire a target image in response to a triggering instruction, wherein the target image is a previous video frame of a reference image, and the reference image is a video frame that is currently acquired by an image sensor;

an image processing module, configured to generate a processed image by performing completion filling on a target region in the reference image with a background region in the target image, wherein the target region is a region covered by a target object in the reference image; and an image display module, configured to display the processed image as the current video frame, wherein the processed image is an image after the target object is at least partially removed from the reference image.

In a third aspect, an embodiment of the present disclosure provides an electronic device, including:

a processor;

a memory, configured to store a computer program of the processor; and a displayer, configured to display a video processed by the processor, wherein the processor is configured to execute the computer program, so as to implement the video processing method in the first aspect and various possible designs of the first aspect.

In a fourth aspect, an embodiment of the present disclosure provides a computer-readable storage medium, wherein a computer executable instruction is stored in the computer-readable storage medium, and when executing the computer executable instruction, a processor implements the video processing method in the first aspect and various possible designs of the first aspect.

In a fifth aspect, an embodiment of the present disclosure provides a computer program product, including a computer program, wherein when executed by a processor, the computer program implements the video processing method in the first aspect and various possible designs of the first aspect.

In a sixth aspect, an embodiment of the present disclosure provides a computer program, wherein when executed by a processor, the computer program implements the video processing method in the first aspect and various possible designs of the first aspect.

According to the video processing method and apparatus, and the device, the medium and the program product provided in the embodiments of the present disclosure, the target image is acquired in response to the triggering instruction, wherein the target image is the previous video frame of the reference image, and the reference image is the video frame that is currently acquired by the image sensor; then completion filling is performed on the target region where the target object in the reference image is located by using the background region in the target image, so as to generate the processed image, therefore, only by means of performing completion processing on two adjacent frames, not only can a completion effect be ensured, but the real-time performance of the completion processing can also be ensured; and finally, the processed image is displayed as the current video frame, so that the processed image is the image after the target object is at least partially removed from the reference image, so as to realize a special effect of the target object disappearing from a video.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings may be obtained by those ordinary skilled in the art without any creative effort.

FIG. 3 illustrates a schematic flowchart of a video processing method according to another example embodiment of the present disclosure;

DETAILED DESCRIPTION OF EMBODIMENTS

Figures 1, 2:
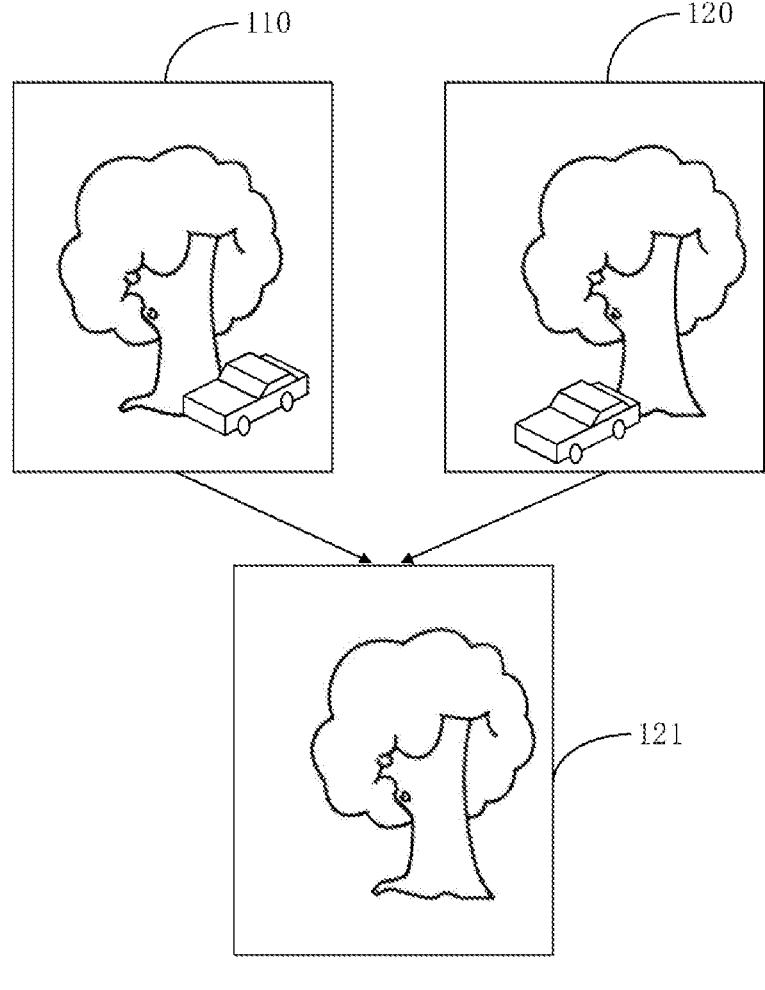
FIG. 1 illustrates a diagram of an application scenario of a video processing method according to an example embodiment of the present disclosure.
FIG. 2 illustrates a schematic flowchart of a video processing method according to an example embodiment of the present disclosure.

Hereinafter, embodiments of the present disclosure will be described in more detail with reference to the drawings. Although some embodiments of the present disclosure have been illustrated in the drawings, it should be understood that the present disclosure may be implemented in various forms and should not be construed as being limited to the embodiments set forth herein; and rather, these embodiments are provided to help understand the present disclosure more thoroughly and completely. It should be understood that the drawings and embodiments of the present disclosure are for exemplary purposes only and are not intended to limit the protection scope of the present disclosure.

It should be understood that various steps recited in method embodiments of the present disclosure may be performed in a different order and/or in parallel. In addition, the method embodiments may include additional steps and/or omit performing the steps shown. The scope of the present disclosure is not limited in this respect.

As used herein, the terms "include" and variations thereof are open-ended terms, i.e., "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that the modifiers such as "one" and "more" mentioned in the present disclosure are intended to be illustrative and not restrictive, and those skilled in the art should understand that they should be interpreted as "one or more" unless the context clearly indicates otherwise.

In a video application, a foreground completion technology may be widely applied to the field of digital entertainment special effects, the existing foreground completion technology usually performs completion by using a deep learning method, and specifically, a video frame is generally completed jointly by an optical flow network and a GAN. However, with regard to the completion mode via deep learning, the calculation amount in a completion process is relatively large. In addition, the existing methods are generally based on multi-frame simultaneous optimization, thereby further increasing the calculation amount in the completion process, and accordingly, it is more difficult to ensure the real-time performance.

The present disclosure aims to provide a video processing method, including: acquiring a target image in response to a triggering instruction, wherein the target image is a previous video frame of a reference image, and the reference image is a video frame that is currently acquired by an image sensor; then performing, by using a background region in the target image, completion filling on a target region where a target object in the reference image is located, so as to generate a processed image, therefore, only by means of performing completion processing on two adjacent frames, not only can a completion effect be ensured, but the real-time performance of the completion processing can also be ensured; and finally, displaying the processed image as the current video frame, so that the processed image is an image after the target object is at least partially removed from the reference image, so as to realize a special effect of the target object disappearing from a video.

FIG. 1 illustrates a diagram of an application scenario of a video processing method according to an example embodiment of the present disclosure. As shown in FIG. 1, the video processing method provided in the present embodiment may be executed by a terminal device provided with a camera and a display screen. Specifically, video photographing may be performed on a target object (e.g., a vehicle, an animal, a plant, a building, and the like) by means of a camera (e.g., a front camera, a rear camera, an external camera, and the like) on the terminal device.

It may be taken as an example for illustration that the target object is a vehicle. In a possible scenario, when the terminal device is used for performing video photographing on a target vehicle, the camera on the terminal device is usually aligned with the target vehicle for photographing. It can be understood that during a view finding process, the camera may acquire a target background in addition to acquiring the target vehicle, at this time, a user may input a triggering instruction (e.g., a target gesture instruction, a target voice instruction, a target expression instruction, a target text instruction, a target limb instruction, and the like) to the terminal device, so that the target object is at least partially removed from the current image of a video.

It is worth noting that, the triggering instruction may be a triggering instruction input by the user, and may also be a triggering instruction sent by the target object in the video. At this time, a video frame currently acquired by an image sensor is a reference image 120, and then a previous video frame of the reference image 120, that is, a background region in the target image 110, is used to perform completion filling on a target region in the reference image, so as to generate and display a processed image 121. Therefore, during the process of photographing or playing the target object, it can be triggered by means of the triggering instruction that the target object is removed from the reference image and a corresponding completion operation is performed, thereby realizing a visual effect of the target object disappearing from the reference image.

FIG. 2 illustrates a schematic flowchart of a video processing method according to an example embodiment of the present disclosure. As shown in FIG. 2, the video processing method provided in the present embodiment includes:

Step 101: acquiring a target image in response to a triggering instruction.

In a possible scenario, when a terminal device is used to perform video photographing on a target object, for example, a target plant or the like, when video photographing is performed, a camera on the terminal device is usually aligned with the target object for photographing. It can be understood that during a view finding process, the camera may also acquire a target background in addition to acquiring the target object.

At this time, the terminal device acquires the target image in response to the triggering instruction, wherein the target image is a previous video frame of a reference image, and the reference image is a video frame that is currently acquired by an image sensor. During the process of performing video photographing on the target object, the user inputs a target gesture instruction (e.g., a hand stretching instruction) to trigger an effect of the target object disappearing from the image, and when the terminal device recognizes the target gesture instruction, a special effect of removing the target object from the reference image may be triggered.

Step 102: generating a processed image by performing completion filling on a target region in the reference image with a background region in the target image.

After the special effect of removing the target object from the reference image is triggered, completion filling is performed on the target region in the reference image by using the background region in the target image, so as to generate the processed image, wherein the target region is a region covered by the target object in the reference image.

During the process of performing target video recording on the target object, the user inputs the hand stretching instruction for triggering, therefore during the process of video recording, a special effect of the target object disappearing from the current frame of a video is realized in response to the gesture of the user. In addition, it is worth noting that, in the present embodiment, the target object may be in the form of a target plant, a target animal, a target building, and the like, which is not specifically limited herein. In addition, the above triggering instruction may also be in the form of a target gesture instruction, a target voice instruction, a target expression instruction, a target text instruction, a target limb instruction, and the like, which is not specifically limited herein as well.

Step 103: displaying the processed image as the current video frame.

In the step, the processed image is displayed as the current video frame, wherein the processed image is an image after the target object is at least partially removed from the reference image, therefore the special effect of the target object disappearing from the current frame of the video is realized.

In the present embodiment, the target image is acquired in response to the triggering instruction, wherein the target image is the previous video frame of the reference image, and the reference image is the video frame that is currently acquired by the image sensor; then completion filling is performed on the target region where the target object in the reference image is located by using the background region in the target image, so as to generate the processed image, therefore, only by means of performing completion processing on two adjacent frames, not only can a completion effect be ensured, but the real-time performance of the completion processing can also be ensured; and finally, the processed image is displayed as the current video frame, so that the processed image is the image after the target object is at least partially removed from the reference image, so as to realize the special effect of the target object disappearing from the video.

FIG. 3 illustrates a schematic flowchart of a video processing method according to another example embodiment of the present disclosure. As shown in FIG. 3, the video processing method provided in the present embodiment includes:

Step 201: acquiring a target image in response to a triggering instruction.

In a possible scenario, when a terminal device is used to perform video photographing on a target object, a camera on the terminal device is usually aligned with the target object for photographing. It can be understood that during a view finding process, the camera may also acquire a target background in addition to acquiring the target object.

At this time, the terminal device acquires the target image in response to the triggering instruction, wherein the target image is a previous video frame of a reference image, and the reference image is a video frame that is currently acquired by an image sensor. During the process of performing video photographing on the target object, the user inputs a target gesture instruction (e.g., a hand stretching instruction) to trigger an effect of the target object disappearing from the image, and when the terminal device recognizes the target gesture instruction, a special effect of removing the target object from the reference image may be triggered.

Step 202: determining a luminosity error of each pixel in the target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background.

In the present step, after the target image and the reference image are acquired, a target foreground corresponding to the target image and a reference foreground corresponding to the reference image may be determined according to a preset foreground segmentation module, the target image includes the target foreground and the target background, the reference image includes the reference foreground and the reference background, and grids are respectively constructed for the target image, the target foreground, the reference image and the reference foreground, so as to generate a target image grid, a target foreground grid, a reference image grid and a reference foreground grid. It is worth noting that, the preset foreground segmentation module may be based on any foreground segmentation algorithm, and is intended to estimate a foreground object mask from the target image by means of computer vision and a graphics algorithm, so as to determine the corresponding target foreground.

Then, the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background are determined, wherein the target background corresponds to the background region in the target image, and the reference background corresponds to a background region in the reference image.

With regard to the construction process of the grids, image pyramids may be respectively constructed for the target image, the target foreground, the reference image and the reference foreground, so as to generate a target image pyramid, a target foreground pyramid, a reference image pyramid and a reference foreground pyramid, which have the same number of layers. Then, a grid is respectively constructed for each image layer in the target image pyramid, the target foreground pyramid, the reference image pyramid and the reference foreground pyramid, wherein the grids of the corresponding layers in the image pyramids have the same shape and scale.

Specifically, L layers of image pyramids may be respectively constructed for the target image $I_{tar}$, the target foreground $F_{tar}$, the reference image $I_{ref}$ and the reference foreground $F_{ref}$, wherein L is generally set to be 3, the 0th layer represents a topmost layer, and the (L−1)th layer represents a bottommost layer.

With regard to each image pyramid mentioned above, firstly, the grid of the topmost image is constructed, the size of each lattice is set to be M×M pixels, the grid is constructed in the space of the target image according to the size of the lattice, and finally $W_{grid} \times H_{grid}$ grid vertexes are generated, wherein the value of M is generally between 30 to 50 pixels. Next, the length and width of the lattice of each next layer of image becomes twice the length and width of the lattice of a previous layer of image, and finally the L layers of images have two-dimensional grids with the same shape but different scales.

With regard to the determination of each pixel in the target background mentioned above, sampling acquisition may be performed on each layer of the image pyramid, specifically, brightness gradients of various pixels on a first target image layer may be calculated, and the various pixels on the first target image layer are traversed according to a preset step length, so as to determine a first target sample set, wherein the pixels in the first target sample set belong to a first target background layer, the brightness gradient corresponding thereto is greater than a preset first threshold value, and the first target image layer and the first target background layer are located on the same layer in the image pyramid. The preset step length may be N pixel points, therefore one pixel point is taken on the first target image layer every after N pixel points, and the traversal direction may be in a transverse direction of the first target image layer and may also be in a longitudinal direction of the first target image layer.

Then, the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer are determined.

Specifically, the brightness gradients of the L layers of target images may be calculated respectively, and the pixels q on each target image layer are traversed at intervals according to a step lengths, wherein s is generally an integer between 1-5. If q is a background pixel, that is, belongs to the L target background layers, and the gradient size at the located position exceeds a threshold value $t_g$, then q is added into L layers of target sample sets of the corresponding level, and each target image layer respectively maintains one sample set. The L layers of target sample sets may be expressed as:

$$S_L = \{q \mid grad(q) > t_g \, \&\& \, q \in Background_L\}$$

grad(q) represents the brightness gradient at the position of the pixel q, $Background_L$ represents L layers of target backgrounds, and $t_g$ may be set to be 0.1.

Step 203: determining an overall cost function according to the luminosity error, the square grid deformation error and the grid vertex inertial error.

In order to implement grid deformation optimization, in the present embodiment, the used overall cost function includes three cost functions, which are respectively a luminosity error $f_q$ based on a sampling point, a square grid deformation error $f_d$, and a grid vertex inertial error $f_V$.

Specifically, with regard to the luminosity error $f_q$, reference may be made to the following formula:

$$f_q = I_{tar}(q) + \sum_{k=1}^{4} \left( C_k \cdot \nabla I_{tar}(q) \cdot t_q^k \right) - I_{ref}(q)$$

wherein, $I_{tar}$ represents the target image, $I_{ref}$ represents the reference image, q represents a pixel position in a target sample set SL, $I_{tar}(q)$ and $I_{ref}(q)$ respectively represent brightness values of the same target image layer and the reference image layer at q, and $\nabla I_{tar}(q)$ represents the brightness gradient of the target image layer at q.

Figure 4:
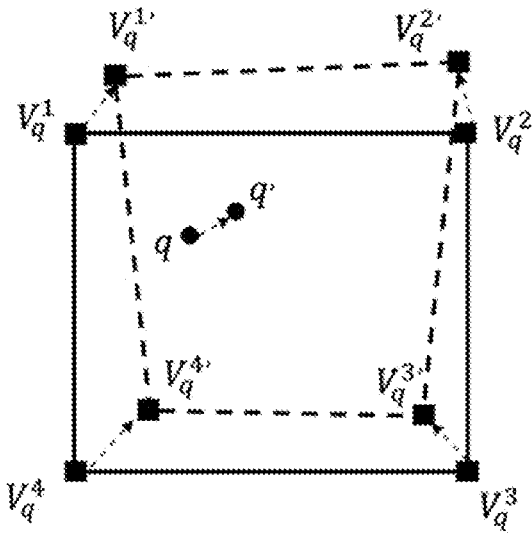
FIG. 4 is a schematic diagram of deformation of a square grid where a pixel is located in the present disclosure.

FIG. 4 is a schematic diagram of deformation of a square grid where a pixel is located in the present disclosure. As shown in FIG. 4, the four vertices of the square grid where q is located are set to be $$V_q^k (k = 1, 2, 3, 4),$$

therefore q can be expressed as a linear combination of the four vertices (wherein coefficient $C_k$ is determined by bilinear interpolation), and then q may be expressed as:

$$q = \sum_{k=1}^{4} C_k \cdot V_q^k$$

A displacement vector $$t_q^k$$

of q may be expressed as:

$$t_q^k = V_q^{k'} - V_q^k \in R^2$$

With continued reference to FIG. 4, a solid quadrangle represents a square grid before deformation, a dotted quadrangle represents a square grid after deformation, the deformation of the square grid is realized by vertex displacement, an interpolation coefficient $C_k$ before and after deformation is kept unchanged, and q is moved to a more suitable position q' by means of the deformation of the square grid, so that the luminosity error is reduced.

With regard to the square grid deformation error $f_d$, reference is made to the following formulas:

$$f_d^{tri1} = l'_{12} \cdot l_{13} - l_{12} \cdot l'_{13}$$

$$f_d^{tri2} = l'_{12} \cdot l_{23} - l_{12} \cdot l'_{23}$$

$$f_d^{tri1}$$

is one component of $f_d$, which is used for representing the size of the deformation error of $l_{12}$ and $l_{13}$ relative to $l'_{12}$ and $l'_{13}$;

$$f_d^{tri2}$$

is other component of $f_d$, which is used for representing the size of the deformation error of $l_{12}$ and $l_{23}$ relative to $l'_{12}$ and $l'_{23}$. $l_{12}$, $l_{13}$ and $l_{23}$ constitute one triangle after the square grid is segmented, and $l'_{12}$, $l'_{13}$ and $l'_{23}$ constitute another triangle after corresponding deformation.

Figure 5:
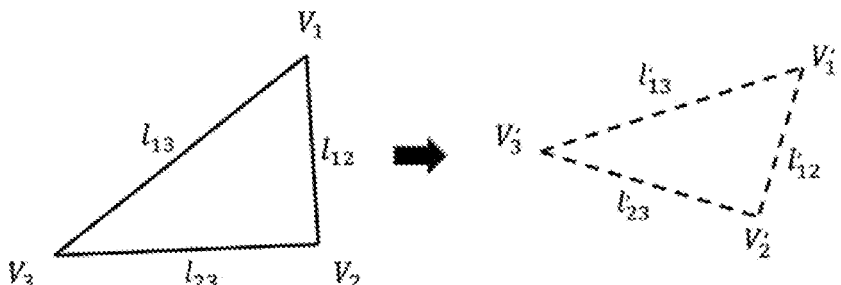
FIG. 5 is a schematic diagram of similarity transformation of a triangle in a grid in the present disclosure.

By means of controlling the square grid deformation error, it can be ensured that the square grid in the grid conforms to similarity transformation as much as possible during deformation, so that an image filled in the foreground region looks more natural in the visual effect and better conforms to perspective transformation. Specifically, each square grid may be divided into two triangles, that is, the grid corresponding to each pixel in the target background is divided into a first triangle and a second triangle, therefore by using the square grid deformation error, the first triangle is converted into a deformed third triangle via similarity transformation, and the second triangle is converted into a deformed fourth triangle via similarity transformation. FIG. 5 is a schematic diagram of similarity transformation of a triangle in a grid in the present disclosure. Referring to FIG. 5, the numerical values of $$f_d^{tri1} \text{ and } f_d^{tri2}$$

may be reduced as much as possible, so as to ensure that each triangle conforms to similarity transformation as much as possible during grid deformation.

Specifically, $\{V_k, k=1,2,3\}$ and $\{V_k, k=1,2,3\}$ respectively represent triangular vertexes before and after deformation, and $\{l_{k1k2}, k1k2=12,13,23\}$ and $\{l'_{k1k2}, k1k2=1,2,3\}$ respectively represent side lengths of the triangle before and after deformation.

With regard to the inertial error $f_V$, reference is made to the following formula:

$$f_V = \|t_V\|_2$$

wherein, $t_V \in R^2$ represents a displacement vector of a grid vertex V, therefore a displacement regularization effect is performed on the grid vertex by means of the inertial error, so as to inhibit an excessive grid vertex displacement.

Then, on the basis of the luminosity error, the square grid deformation error and the inertial error, an overall cost function may be constructed:

$$f = \lambda_1 \cdot \sum_{q \in S_t} f_q + \lambda_2 \cdot \sum_{tri \in all\ triangles} f_d^{tri} + \lambda_3 \cdot \sum_{V \in all\ vertices} f_V$$

Therefore, by using the overall cost function, an obtained optimization variable is the displacement vector $t_V$ of each grid vertex. With regard to an optimization algorithm, a Gaussian Newton or Levenberg Marquardt (LM) algorithm may be used to obtain the displacement vector of the grid vertex, so as to implement grid deformation. Moreover, the value of $\lambda_2$ may be 1, the value of $\lambda_2$ may be 0.2-0.5, and the value of $\lambda_3$ may be 0.1.

Step 204: according to the overall cost function and a preset optimization algorithm, determining the displacement vector of the grid vertex corresponding to each pixel in the target background.

According to the overall cost function and the preset optimization algorithm, the displacement vector of the grid vertex corresponding to each pixel in the target background is determined, so as to adjust the target image according to the displacement vector to generate an optimized target image. In a possible implementation, grid deformation may be performed on a corresponding pixel in the first target sample set according to the displacement vector, and a grid deformation result is transmitted to the next target image layer in the target image pyramid until the bottommost layer of the target image pyramid, so as to generate the optimized target image, wherein the first target image layer is the topmost layer of the target image pyramid, and the transmission direction of the grid deformation result is pointing from the topmost layer of the target image pyramid to the bottommost layer.

With regard to the process of transmitting the grid deformation result to the next target image layer in the target image pyramid, a coarse-to-fine mode may be utilized, that is, starting from the grid on the topmost layer, the deformed grid vertex is transmitted to the next layer one by one to execute position optimization of the grid vertex until the deformed grid vertex on the bottommost layer. It can be understood that, when the first target image layer is the first layer of the image pyramid, grid deformation may be performed on the corresponding pixel in the first target sample set according to the displacement vector, and the grid deformation result is transmitted to a second target image layer in the target image pyramid, that is, the grid deformation result of the first target image layer is used as an initial grid of the second target image layer prior to grid deformation. Then, grid deformation is performed on the second target image layer in the same manner, and the grid deformation result is transmitted to a third target image layer in the target image pyramid, that is, the grid deformation result of the second target image layer is used as an initial grid of the third target image layer prior to grid deformation. Finally, the grid deformation is performed on the third target image layer in the same manner, and the grid deformation result is transmitted to a fourth target image layer in the target image pyramid, that is, the grid deformation result of the third target image layer is used as an initial grid of the fourth target image layer prior to grid deformation.

In addition, it is worth noting that, when grid division is performed on each image layer of the pyramid, the length and width of the lattice of each next layer of image become twice the length and width of the lattice of the previous layer of image, therefore when the position optimization result of the grid vertex of the previous layer is transmitted to the next layer of image, scale expansion processing needs to be performed, that is, $V''=2 \cdot V'$, wherein $V''$ represents the position of the grid vertex of the next layer, and $V'$ represents the position of the grid vertex of the previous layer.

Step 205: adjusting the target image according to the displacement vector, so as to generate an optimized target image.

After the displacement vector of the grid vertex corresponding to each pixel in the target background is determined according to the overall cost function and the preset optimization algorithm, so as to adjust the target image according to the displacement vector, that is, the optimization of the deformed grid vertex on the bottommost layer is completed, the optimized target image may be generated.

Step 206: calculating a dense optical flow of the reference image relative to the optimized target image.

Step 207: performing completion filling on a target region in the reference image according to the dense optical flow.

Next, after the optimized target image is generated, the dense optical flow of the reference image relative to the optimized target image may be calculated, so as to perform completion filling on the target region in the reference image according to the dense optical flow. Therefore, during the process of performing target video recording on the target object, by means of a triggering instruction, the user can enable the terminal device to respond to a gesture of the user, so as to realize a special effect of the target object disappearing from the current frame of a video.

In addition, in the present embodiment, by using the strategy of completing two adjacent frames, not only can a completion effect be ensured, but the real-time performance of the completion processing can also be ensured. In addition, by utilizing grid optimization, it is ensured that the calculated dense optical flow can not only guarantee a relatively low luminosity error of an overlapping background region of the target image and the reference image, but also can guarantee the adjacent pixels to share a consistent optical flow vector, thereby effectively predicting the pixel optical flow of the foreground region. In addition, by means of constructing the image pyramid, and then sequentially transmitting the grid vertex deformation of each layer one by one, that is, starting from the topmost layer of the image pyramid, transmitting the grid vertex deformation of the previous layer to the next layer until the bottommost layer of the image pyramid, a multi-scale processing strategy is formed to accelerate the calculation of the optical flow.

According to the video processing method in the above embodiment, during the process of performing foreground real-time completion on the reference image with the target image, the rendering image quality in the foreground region in a static state is gradually blurred due to the adoption of the bilinear interpolation. Therefore, on the basis of the above embodiment, before completion filling is performed the target region in the reference image by using the background region in the target image, it is also necessary to first determine that the image acquisition state is a motional acquisition state. Specifically, in step 201 to step 204 in the above embodiment, the displacement of each grid vertex in the optimized target image relative to each corresponding grid vertex in the target image is calculated, then an average displacement is calculated, and if the average displacement is greater than or equal to a preset displacement threshold value, it is determined that the image acquisition state is the motional acquisition state. The displacement threshold value may be set to be 0.3-0.5 pixel lengths.

If the determined average displacement is less than the preset displacement threshold value, at this time, the image acquisition state is a stationary acquisition state, then the target image $I_{tar}$ is set to be a background image $I_{bg}$, and the target foreground $F_{tar}$ is set to be a background foreground $F_{bg}$. With regard to a subsequent newly added video frame, if the image acquisition state is the stationary acquisition state, the background image is used for completion, or otherwise, a motion state foreground completion strategy is used, that is, the steps in the embodiment shown in FIG. 2 or FIG. 3.

The completion algorithm based on the background image $I_{bg}$ is as follows:

Step 1: updating the background image. The background image $I_{bg}$ and background foreground $F_{bg}$ may be updated using the background region of the reference image every 5-10 frames.

Step 2: completing the reference image. The foreground region of the reference image is filled with the background region of the background image $I_{bg}$, and meanwhile, a foreground template of the reference image is updated.

In the above embodiment, the image acquisition state is determined by judging the relationship between the average displacement of the grid vertex and the preset displacement threshold value; and then, the corresponding foreground completion strategy is selected according to the determined image acquisition state, therefore not only can the effect and real-time performance of foreground completion in the motional acquisition state be ensured, but the foreground completion effect in the stationary acquisition state can also be ensured.

Figure 6:
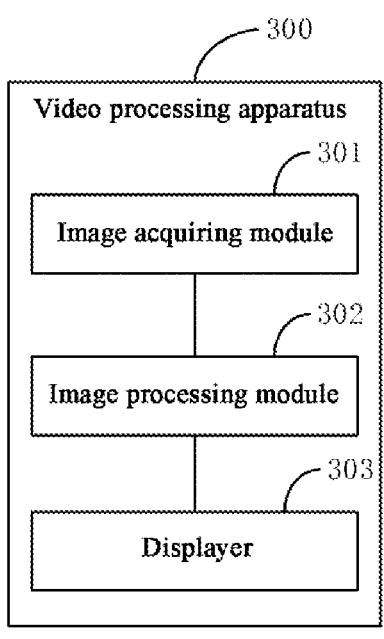
FIG. 6 illustrates a schematic structural diagram of a video processing apparatus according to an example embodiment of the present disclosure.

FIG. 6 illustrates a schematic structural diagram of a video processing apparatus according to an example embodiment of the present disclosure. As shown in FIG. 6, the video processing apparatus 300 provided in the present embodiment includes:

an image acquiring module 301, configured to acquire a target image in response to a triggering instruction, wherein the target image is a previous video frame of a reference image, and the reference image is a video frame that is currently acquired by an image sensor;

an image processing module 302, configured to generate a processed image ny performing completion filling on a target region in the reference image with a background region in the target image, wherein the target region is a region covered by a target object in the reference image; and a displayer 303, configured to display the processed image as the current video frame, wherein the processed image is an image after the target object is at least partially removed from the reference image.

According to one or more embodiments of the present disclosure, the image processing module 302 is specifically configured to:

determine a luminosity error of each pixel in the target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background, wherein the target background corresponds to the background region in the target image, and the reference background corresponds to the background region in the reference image;

determine an overall cost function according to the luminosity error, the square grid deformation error and the grid vertex inertial error;

according to the overall cost function and a preset optimization algorithm, determine a displacement vector of the grid vertex corresponding to each pixel in the target background, so as to adjust the target image according to the displacement vector to generate an optimized target image; and calculate a dense optical flow of the reference image relative to the optimized target image, so as to perform completion filling on the target region in the reference image according to the dense optical flow.

According to one or more embodiments of the present disclosure, the image processing module 302 is further configured to:

determine a target foreground corresponding to the target image and a reference foreground corresponding to the reference image, wherein the target image includes the target foreground and the target background, and the reference image includes the reference foreground and the reference background; and respectively construct grids for the target image, the target foreground, the reference image and the reference foreground, so as to generate a target image grid, a target foreground grid, a reference image grid and a reference foreground grid.

According to one or more embodiments of the present disclosure, the image processing module 302 is specifically configured to:

respectively construct image pyramids for the target image, the target foreground, the reference image and the reference foreground, so as to generate a target image pyramid, a target foreground pyramid, a reference image pyramid and a reference foreground pyramid, which have the same number of layers; and respectively construct a grid for each image layer in the target image pyramid, the target foreground pyramid, the reference image pyramid and the reference foreground pyramid, wherein the grids in corresponding layers in the image pyramids have the same shape and scale.

According to one or more embodiments of the present disclosure, the image processing module 302 is specifically configured to:

calculate brightness gradients of various pixels on a first target image layer, and traverse the various pixels on the first target image layer according to a preset step length, so as to determine a first target sample set, wherein the pixels in the first target sample set belong to a first target background layer, the brightness gradient corresponding thereto is greater than a preset first threshold value, and the first target image layer and the first target background layer are located on the same layer in the image pyramid; and determine the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer.

According to one or more embodiments of the present disclosure, the image processing module 302 is specifically configured to:

perform grid deformation on a corresponding pixel in the first target sample set according to the displacement vector, and transmit a grid deformation result to the next target image layer in the target image pyramid until the bottommost layer of the target image pyramid, so as to generate the optimized target image, wherein the first target image layer is the topmost layer of the target image pyramid.

According to one or more embodiments of the present disclosure, the image processing module 302 is specifically configured to:

divide, into a first triangle and a second triangle, a grid corresponding to each pixel in the target background; and according to the square grid deformation error, convert the first triangle into a deformed third triangle via similarity transformation, and convert the second triangle into a deformed fourth triangle via similarity transformation.

According to one or more embodiments of the present disclosure, the image processing module 302 is further configured to: determine that the image acquisition state is a motional acquisition state.

According to one or more embodiments of the present disclosure, the image processing module 302 is specifically configured to:

calculate an average displacement of each grid vertex in the optimized target image relative to each corresponding grid vertex in the target image; and if the average displacement is greater than or equal to a preset displacement threshold value, determine that the image acquisition state is the motional acquisition state.

It should be noted that, the video processing apparatus provided in the embodiment shown in FIG. 6 may be used for executing the steps of the method provided in any one of the above method embodiments, and the specific implementations and technical effects are similar, thus details are not described herein again.

Figure 7:
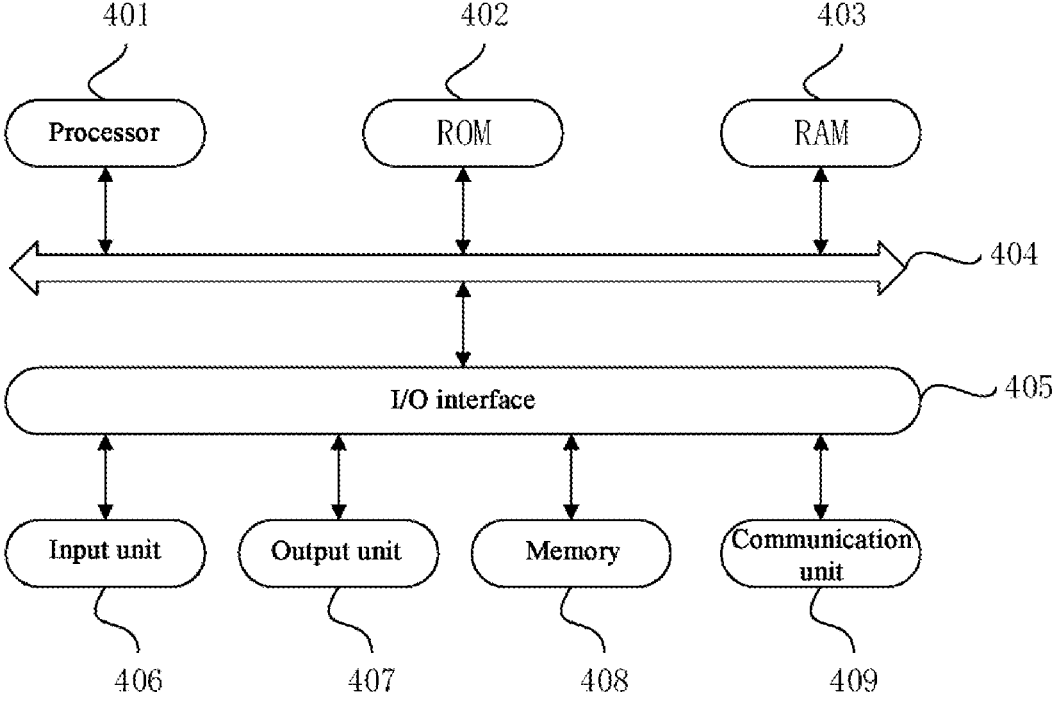
FIG. 7 illustrates a schematic structural diagram of an electronic device according to an example embodiment of the present disclosure.

FIG. 7 illustrates a schematic structural diagram of an electronic device according to an example embodiment of the present disclosure. As shown in FIG. 7, it illustrates a schematic structural diagram of an electronic device 400 suitable for implementing the embodiments of the present disclosure. A terminal device in the embodiment of the present disclosure may include, but is not limited to, mobile terminals with image acquisition functions, such as mobile phones, notebook computers, digital broadcast receivers, personal digital assistants (PDAs for short), portable Android devices (PADs for short), portable media players (PMPs for short), vehicle-mounted terminals (e.g., vehicle-mounted navigation terminals), and the like, and fixed terminals with external image acquisition devices, such as digital TVs, desktop computers, smart home devices and the like. The electronic device shown in FIG. 7 is merely an example, and should not bring any limitation to the functions and use ranges of the embodiments of the present disclosure.

As shown in FIG. 7, the electronic device 400 may include a processor (e.g., a central processing unit, a graphics processing unit, or the like) 401, which may perform various suitable actions and processes in accordance with a program stored in a read only memory (ROM for short) 402 or a program loaded from a memory 408 into a random access memory (RAM for short) 403. In the RAM 403, various programs and data needed by the operations of the electronic device 400 are also stored. The processor 401, the ROM 402 and the RAM 403 are connected to each other via a bus 404. An input/output (I/O for short) interface 405 is also connected to the bus 404. The memory is used for storing a program for executing the video processing method in various foregoing method embodiments; and the processing unit is configured to execute the program stored in the memory.

In general, the following apparatuses may be connected to the I/O interface 405: an input unit 406, including, for example, a touch screen, a touch pad, a keyboard, a mouse, a camera, a microphone, an accelerometer, a gyroscope, and the like; an output unit 407, including, for example, a liquid crystal display (LCD for short), a speaker, a vibrator, and the like; a memory 408, including, for example, a magnetic tape, a hard disk, and the like; and a communication unit 409. The communication unit 409 may allow the electronic device 400 to communicate in a wireless or wired manner with other devices to exchange data. Although FIG. 7 illustrates the electronic device 400 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer-readable storage medium, which includes a computer program carried on a non-transitory computer-readable medium, and the computer program contains program codes for performing the video processing method illustrated in the flowcharts of the embodiments of the present disclosure. In such embodiments, the computer program may be downloaded and installed from a network via the communication unit 409, or installed from the memory 408, or installed from the ROM 402. When the computer program is executed by the processor 401, the above video processing function defined in the method of the embodiments of the present disclosure is performed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read only memory (ROM), an erasable programmable read only memory (EPROM for short or flash memory), an optical fiber, a portable compact disc read only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, radio frequency (RF), and the like, or any suitable combination thereof.

The computer-readable storage medium may be contained in the above electronic device; and it may also be present separately and is not assembled into the electronic device.

The computer-readable storage medium carries one or more programs that, when executed by the electronic device, cause the electronic device to perform the following steps: acquiring a target image in response to a triggering instruction, wherein the target image is a previous video frame of a reference image, and the reference image is a video frame that is currently acquired by an image sensor; generating a processed image by performing completion filling on a target region in the reference image with a background region in the target image, wherein the target region is a region covered by a target object in the reference image; and displaying the processed image as the current video frame, wherein the processed image is an image after the target object is at least partially removed from the reference image.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN for short) or a wide area network (WAN for short), or it may be connected to an external computer (e.g., through the Internet using an Internet service provider).

In some implementations, a client and the server may perform communication by using any currently known or future-developed network protocol, such as an hypertext transfer protocol (HTTP for short), and may be interconnected with any form or medium of digital data communication (e.g., a communication network). Examples of the communication network comprise a local area network ("LAN"), a wide area network ("WANs"), an international network (e.g., the Internet), and a peer-to-peer network (e.g., an ad hoc peer-to-peer network), as well as any currently known or future-developed network.

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the order annotated in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case. For example, a display module may also be described as "a unit for displaying an object face and a face mask sequence".

The functions described herein above may be performed, at least in part, by one or more hardware logic components. For example, without limitation, example types of the hardware logic components that may be used include: a field programmable gate array (FPGA for short), an application specific integrated circuit (ASIC for short), an application specific standard product (ASSP for short), a system on chip (SOC for short), a complex programmable logic device (CPLD for short), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

In a first aspect, according to one or more embodiments of the present disclosure, provided is a video processing method, including:

acquiring a target image in response to a triggering instruction, wherein the target image is a previous video frame of a reference image, and the reference image is a video frame that is currently acquired by an image sensor;

generating a processed image by performing completion filling on a target region in the reference image with a background region in the target image, wherein the target region is a region covered by a target object in the reference image; and displaying the processed image as the current video frame, wherein the processed image is an image after the target object is at least partially removed from the reference image.

According to one or more embodiments of the present disclosure, performing completion filling on the target region in the reference image with the background region in the target image, includes:

determining a luminosity error of each pixel in a target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background, wherein the target background corresponds to the background region in the target image, and the reference background corresponds to the background region in the reference image;

determining an overall cost function according to the luminosity error, the square grid deformation error and the grid vertex inertial error;

according to the overall cost function and a preset optimization algorithm, determining a displacement vector of the grid vertex corresponding to each pixel in the target background, so as to adjust the target image according to the displacement vector to generate an optimized target image;

calculating a dense optical flow of the reference image relative to the optimized target image; and performing completion filling on the target region in the reference image according to the dense optical flow.

According to one or more embodiments of the present disclosure, before determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, the method further includes:

determining a target foreground corresponding to the target image and a reference foreground corresponding to the reference image, wherein the target image includes the target foreground and the target background, and the reference image includes the reference foreground and the reference background; and respectively constructing grids for the target image, the target foreground, the reference image and the reference foreground, so as to generate a target image grid, a target foreground grid, a reference image grid and a reference foreground grid.

According to one or more embodiments of the present disclosure, respectively constructing grids for the target image, the target foreground, the reference image, and the reference foreground, so as to generate the target image grid, the target foreground grid, the reference image grid and the reference foreground grid, includes:

respectively constructing image pyramids for the target image, the target foreground, the reference image and the reference foreground, so as to generate a target image pyramid, a target foreground pyramid, a reference image pyramid and a reference foreground pyramid, which have the same number of layers; and respectively constructing a grid for each image layer in the target image pyramid, the target foreground pyramid, the reference image pyramid and the reference foreground pyramid, wherein the grids in corresponding layers in the image pyramids have the same shape and scale.

According to one or more embodiments of the present disclosure, determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, includes:

calculating brightness gradients of various pixels on a first target image layer, and traversing the various pixels on the first target image layer according to a preset step length, so as to determine a first target sample set, wherein the pixels in the first target sample set belong to a first target background layer, the brightness gradient corresponding thereto is greater than a preset first threshold value, and the first target image layer and the first target background layer are located on the same layer in the image pyramid; and determining the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer.

According to one or more embodiments of the present disclosure, according to the overall cost function and the preset optimization algorithm, determining the displacement vector of the grid vertex corresponding to each pixel in the target background, so as to adjust the target image according to the displacement vector to generate the optimized target image, includes:

performing grid deformation on a corresponding pixel in the first target sample set according to the displacement vector, and transmitting a grid deformation result to the next target image layer in the target image pyramid until the bottommost layer of the target image pyramid, so as to generate the optimized target image, wherein the first target image layer is the topmost layer of the target image pyramid.

According to one or more embodiments of the present disclosure, after determining the square grid deformation error of the grid vertex corresponding to each pixel in the target background, which is determined according to similarity transformation, the method further includes:

dividing, into a first triangle and a second triangle, a grid corresponding to each pixel in the target background; and according to the square grid deformation error, converting the first triangle into a deformed third triangle via similarity transformation, and converting the second triangle into a deformed fourth triangle via similarity transformation.

According to one or more embodiments of the present disclosure, before performing completion filling on the target region in the reference image with the background region in the target image, the method further includes:

determining that the image acquisition state is a motional acquisition state.

According to one or more embodiments of the present disclosure, determining that the image acquisition state is the motional acquisition state, includes:

calculating an average displacement of each grid vertex in the optimized target image relative to each corresponding grid vertex in the target image; and if the average displacement is greater than or equal to a preset displacement threshold value, determining that the image acquisition state is the motional acquisition state.

In a second aspect, according to one or more embodiments of the present disclosure, provided is a video processing apparatus, including:

an image acquiring module, configured to acquire a target image in response to a triggering instruction, wherein the target image is a previous video frame of a reference image, and the reference image is a video frame that is currently acquired by an image sensor;

an image processing module, configured to generate a processed image by performing completion filling on a target region in the reference image with a background region in the target image, wherein the target region is a region covered by a target object in the reference image; and a displayer, configured to display the processed image as the current video frame, wherein the processed image is an image after the target object is at least partially removed from the reference image.

According to one or more embodiments of the present disclosure, the image processing module is specifically configured to:

determine a luminosity error of each pixel in a target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background, wherein the target background corresponds to the background region in the target image, and the reference background corresponds to the background region in the reference image;

determine an overall cost function according to the luminosity error, the square grid deformation error and the grid vertex inertial error;

according to the overall cost function and a preset optimization algorithm, determine a displacement vector of the grid vertex corresponding to each pixel in the target background, so as to adjust the target image according to the displacement vector to generate an optimized target image; and calculate a dense optical flow of the reference image relative to the optimized target image, so as to perform completion filling on the target region in the reference image according to the dense optical flow.

According to one or more embodiments of the present disclosure, the image processing module is further configured to:

determine a target foreground corresponding to the target image and a reference foreground corresponding to the reference image, wherein the target image includes the target foreground and the target background, and the reference image includes the reference foreground and the reference background; and respectively construct grids for the target image, the target foreground, the reference image and the reference foreground, so as to generate a target image grid, a target foreground grid, a reference image grid and a reference foreground grid.

According to one or more embodiments of the present disclosure, the image processing module is specifically configured to:

respectively construct image pyramids for the target image, the target foreground, the reference image and the reference foreground, so as to generate a target image pyramid, a target foreground pyramid, a reference image pyramid and a reference foreground pyramid, which have the same number of layers; and respectively construct a grid for each image layer in the target image pyramid, the target foreground pyramid, the reference image pyramid and the reference foreground pyramid, wherein the grids in corresponding layers in the image pyramids have the same shape and scale.

According to one or more embodiments of the present disclosure, the image processing module is specifically configured to:

calculate brightness gradients of various pixels on a first target image layer, and traverse the various pixels on the first target image layer according to a preset step length, so as to determine a first target sample set, wherein the pixels in the first target sample set belong to a first target background layer, the brightness gradient corresponding thereto is greater than a preset first threshold value, and the first target image layer and the first target background layer are located on the same layer in the image pyramid; and determine the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer.

According to one or more embodiments of the present disclosure, the image processing module is specifically configured to:

perform grid deformation on a corresponding pixel in the first target sample set according to the displacement vector, and transmit a grid deformation result to the next target image layer in the target image pyramid until the bottommost layer of the target image pyramid, so as to generate the optimized target image, wherein the first target image layer is the topmost layer of the target image pyramid.

According to one or more embodiments of the present disclosure, the image processing module is specifically configured to:

divide, into a first triangle and a second triangle, a grid corresponding to each pixel in the target background; and according to the square grid deformation error, convert the first triangle into a deformed third triangle via similarity transformation, and convert the second triangle into a deformed fourth triangle via similarity transformation.

According to one or more embodiments of the present disclosure, the image processing module is further configured to: determine that the image acquisition state is a motional acquisition state.

According to one or more embodiments of the present disclosure, the image processing module is specifically configured to:

calculate an average displacement of each grid vertex in the optimized target image relative to each corresponding grid vertex in the target image; and if the average displacement is greater than or equal to a preset displacement threshold value, determine that the image acquisition state is the motional acquisition state.

In a third aspect, an embodiment of the present disclosure provides an electronic device, including:

a processor;

a memory, configured to store a computer program of the processor; and a displayer, configured to display a video processed by the processor, wherein the processor is configured to execute the computer program, so as to implement the video processing method in the first aspect and various possible designs of the first aspect.

In a fourth aspect, an embodiment of the present disclosure provides a computer-readable storage medium, wherein a computer executable instruction is stored in the computer-readable storage medium, and when executing the computer executable instruction, a processor implements the video processing method in the first aspect and various possible designs of the first aspect.

In a fifth aspect, an embodiment of the present disclosure provides a computer program product, including a computer program, wherein when executed by a processor, the computer program implements the video processing method in the first aspect and various possible designs of the first aspect.

In a sixth aspect, an embodiment of the present disclosure provides a computer program, wherein when executed by a processor, the computer program implements the video processing method in the first aspect and various possible designs of the first aspect.

What have been described above are only preferred embodiments of the present disclosure and illustrations of the technical principles employed. It will be appreciated by those skilled in the art that the disclosure scope involved herein is not limited to the technical solutions formed by specific combinations of the above technical features, and meanwhile should also include other technical solutions formed by any combinations of the above technical features or equivalent features thereof without departing from the concept of the disclosure, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms of implementing the claims.

What is claimed is:

1. A video processing method, comprising:

acquiring a target image in response to a triggering instruction, wherein the target image is a previous video frame of a reference image, and the reference image is a video frame that is currently acquired by an image sensor;

generating a processed image by performing completion filling on a target region in the reference image with a background region in the target image, wherein the target region is a region covered by a target object in the reference image; and displaying the processed image as the current video frame, wherein the processed image is an image after the target object is at least partially removed from the reference image, wherein performing completion filling on the target region in the reference image with the background region in the target image comprises:

determining a luminosity error of each pixel in a target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background, wherein the target background corresponds to the background region in the target image, and the reference background corresponds to the background region in the reference image;

determining an overall cost function according to the luminosity error, the square grid deformation error and the grid vertex inertial error;

determining a displacement vector of the grid vertex corresponding to each pixel in the target background according to the overall cost function and a preset optimization algorithm, to adjust the target image according to the displacement vector to generate an optimized target image;

calculating a dense optical flow of the reference image relative to the optimized target image; and performing completion filling on the target region in the reference image according to the dense optical flow.

2. The video processing method according to claim 1, wherein before determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, the method further comprises:

determining a target foreground corresponding to the target image and a reference foreground corresponding to the reference image, wherein the target image comprises the target foreground and the target background, and the reference image comprises the reference foreground and the reference background; and generating a target image grid, a target foreground grid, a reference image grid and a reference foreground grid by constructing grids for the target image, the target foreground, the reference image and the reference foreground respectively.

3. The video processing method according to claim 2, wherein generating the target image grid, the target foreground grid, the reference image grid and the reference foreground grid by constructing grids for the target image, the target foreground, the reference image and the reference foreground respectively, comprises:

generating a target image pyramid, a target foreground pyramid, a reference image pyramid and a reference foreground pyramid having the same number of layers by constructing image pyramids for the target image, the target foreground, the reference image and the reference foreground respectively; and constructing a grid for each image layer in the target image pyramid, the target foreground pyramid, the reference image pyramid and the reference foreground pyramid respectively, wherein the grids in corresponding layers in the image pyramids have the same shape and scale.

4. The video processing method according to claim 1, wherein determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, comprises:

determining a first target sample set by calculating brightness gradients of various pixels on a first target image layer and traversing the various pixels on the first target image layer according to a preset step length, wherein the pixels in the first target sample set belong to a first target background layer, the brightness gradient corresponding thereto is greater than a preset first threshold value, and the first target image layer and the first target background layer are located on the same layer in the image pyramid; and determining the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer.

5. The video processing method according to claim 4, wherein determining the displacement vector of the grid vertex corresponding to each pixel in the target background according to the overall cost function and the preset optimization algorithm, to adjust the target image according to the displacement vector to generate the optimized target image, comprises:

generating the optimized target image by performing grid deformation on a corresponding pixel in the first target sample set according to the displacement vector and transmitting a grid deformation result to the next target image layer in the target image pyramid until the bottommost layer of the target image pyramid, wherein the first target image layer is the topmost layer of the target image pyramid.

6. The video processing method according to claim 1, wherein after determining the square grid deformation error of the grid vertex corresponding to each pixel in the target background, which is determined according to similarity transformation, the method further comprises:

dividing, into a first triangle and a second triangle, a grid corresponding to each pixel in the target background; and according to the square grid deformation error, converting the first triangle into a deformed third triangle via similarity transformation, and converting the second triangle into a deformed fourth triangle via similarity transformation.

7. The video processing method according to claim 1, wherein before performing completion filling on the target region in the reference image with the background region in the target image, the method further comprises:

determining that the image acquisition state is a motional acquisition state.

8. The video processing method according to claim 7, wherein determining that the image acquisition state is the motional acquisition state, comprises:

calculating an average displacement of each grid vertex in the optimized target image relative to each corresponding grid vertex in the target image; and determining that the image acquisition state is the motional acquisition state in response to the average displacement being greater than or equal to a preset displacement threshold value.

9. An electronic device, comprising:

a processor;

a memory, configured to store a computer program of the processor, wherein the processor is configured to execute the computer program to execute acts comprising:

acquiring a target image in response to a triggering instruction, wherein the target image is a previous video frame of a reference image, and the reference image is a video frame that is currently acquired by an image sensor;

generating a processed image by performing completion filling on a target region in the reference image with a background region in the target image, wherein the target region is a region covered by a target object in the reference image; and displaying the processed image as the current video frame, wherein the processed image is an image after the target object is at least partially removed from the reference image, wherein performing completion filling on the target region in the reference image with the background region in the target image comprises:

determining a luminosity error of each pixel in a target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background, wherein the target background corresponds to the background region in the target image, and the reference background corresponds to the background region in the reference image;

determining an overall cost function according to the luminosity error, the square grid deformation error and the grid vertex inertial error;

determining a displacement vector of the grid vertex corresponding to each pixel in the target background according to the overall cost function and a preset optimization algorithm, to adjust the target image according to the displacement vector to generate an optimized target image;

calculating a dense optical flow of the reference image relative to the optimized target image;

performing completion filling on the target region in the reference image according to the dense optical flow; and a displayer, configured to display a video processed by the processor.

10. A non-transitory computer-readable storage medium, wherein a computer executable instruction is stored in the computer-readable storage medium, and when executing the computer executable instruction, a processor executes acts comprising:

acquiring a target image in response to a triggering instruction, wherein the target image is a previous video frame of a reference image, and the reference image is a video frame that is currently acquired by an image sensor;

generating a processed image by performing completion filling on a target region in the reference image with a background region in the target image, wherein the target region is a region covered by a target object in the reference image; and displaying the processed image as the current video frame, wherein the processed image is an image after the target object is at least partially removed from the reference image, wherein performing completion filling on the target region in the reference image with the background region in the target image comprises:

determining a luminosity error of each pixel in a target background relative to a corresponding pixel in a reference background, a square grid deformation error of a grid vertex corresponding to each pixel in the target background, which is determined according to similarity transformation, and a grid vertex inertial error of displacement regularization of the grid vertex corresponding to each pixel in the target background, wherein the target background corresponds to the background region in the target image, and the reference background corresponds to the background region in the reference image;

determining an overall cost function according to the luminosity error, the square grid deformation error and the grid vertex inertial error;

determining a displacement vector of the grid vertex corresponding to each pixel in the target background according to the overall cost function and a preset optimization algorithm, to adjust the target image according to the displacement vector to generate an optimized target image;

calculating a dense optical flow of the reference image relative to the optimized target image; and performing completion filling on the target region in the reference image according to the dense optical flow.

11. The electronic device according to claim 9, wherein before determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, the acts further comprise:

determining a target foreground corresponding to the target image and a reference foreground corresponding to the reference image, wherein the target image comprises the target foreground and the target background, and the reference image comprises the reference foreground and the reference background; and generating a target image grid, a target foreground grid, a reference image grid and a reference foreground grid by constructing grids for the target image, the target foreground, the reference image and the reference foreground respectively.

12. The electronic device according to claim 11, wherein generating the target image grid, the target foreground grid, the reference image grid and the reference foreground grid by constructing grids for the target image, the target foreground, the reference image and the reference foreground respectively, comprises:

generating a target image pyramid, a target foreground pyramid, a reference image pyramid and a reference foreground pyramid having the same number of layers by constructing image pyramids for the target image, the target foreground, the reference image and the reference foreground respectively; and constructing a grid for each image layer in the target image pyramid, the target foreground pyramid, the reference image pyramid and the reference foreground pyramid respectively, wherein the grids in corresponding layers in the image pyramids have the same shape and scale.

13. The electronic device according to claim 9, wherein determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, comprises:

determining a first target sample set by calculating brightness gradients of various pixels on a first target image layer and traversing the various pixels on the first target image layer according to a preset step length, wherein the pixels in the first target sample set belong to a first target background layer, the brightness gradient corresponding thereto is greater than a preset first threshold value, and the first target image layer and the first target background layer are located on the same layer in the image pyramid; and determining the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer.

14. The electronic device according to claim 9, wherein after determining the square grid deformation error of the grid vertex corresponding to each pixel in the target background, which is determined according to similarity transformation, the acts further comprise:

dividing, into a first triangle and a second triangle, a grid corresponding to each pixel in the target background; and according to the square grid deformation error, converting the first triangle into a deformed third triangle via similarity transformation, and converting the second triangle into a deformed fourth triangle via similarity transformation.

15. The non-transitory computer-readable storage medium according to claim 10, wherein before determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, the acts further comprise:

determining a target foreground corresponding to the target image and a reference foreground corresponding to the reference image, wherein the target image comprises the target foreground and the target background, and the reference image comprises the reference foreground and the reference background; and generating a target image grid, a target foreground grid, a reference image grid and a reference foreground grid by constructing grids for the target image, the target foreground, the reference image and the reference foreground respectively.

16. The non-transitory computer-readable storage medium according to claim 10, wherein determining the luminosity error of each pixel in the target background relative to the corresponding pixel in the reference background, the square grid deformation error of the grid vertex corresponding to each pixel in the target background, which is determined according to similarity transformation, and the grid vertex inertial error of displacement regularization of the grid vertex corresponding to each pixel in the target background, comprises:

determining a first target sample set by calculating brightness gradients of various pixels on a first target image layer and traversing the various pixels on the first target image layer according to a preset step length, wherein the pixels in the first target sample set belong to a first target background layer, the brightness gradient corresponding thereto is greater than a preset first threshold value, and the first target image layer and the first target background layer are located on the same layer in the image pyramid; and determining the luminosity error of each pixel on the first target image layer relative to the corresponding pixel in the reference background, the square grid deformation error of the grid vertex corresponding to each pixel on the first target image layer, which is determined according to similarity transformation, and the grid vertex inertial error of displacement regularization of the grid vertex corresponding to each pixel on the first target image layer.

17. The non-transitory computer-readable storage medium according to claim 10, wherein after determining the square grid deformation error of the grid vertex corresponding to each pixel in the target background, which is determined according to similarity transformation, the acts further comprise:

dividing, into a first triangle and a second triangle, a grid corresponding to each pixel in the target background; and according to the square grid deformation error, converting the first triangle into a deformed third triangle via similarity transformation, and converting the second triangle into a deformed fourth triangle via similarity transformation.

* * * * *